United States Patent [19]
Yanagida

[11] Patent Number: 5,202,877
[45] Date of Patent: Apr. 13, 1993

[54] APPARATUS FOR DETECTING UNUSED SECTOR ON RECORD MEDIUM

[75] Inventor: Tsuneo Yanagida, Hino, Japan

[73] Assignee: Olympus Optical Co., Ltd., Tokyo, Japan

[21] Appl. No.: 619,918

[22] Filed: Nov. 30, 1990

[30] Foreign Application Priority Data

Nov. 30, 1989 [JP] Japan .................................. 1-308979

[51] Int. Cl.⁵ ................................................ G11B 3/90
[52] U.S. Cl. ........................................ 369/58; 369/48; 369/54
[58] Field of Search ........................ 369/54, 58, 32, 59, 369/53, 48, 50, 47; 360/31, 48

[56] References Cited

U.S. PATENT DOCUMENTS

| | | | |
|---|---|---|---|
| 4,546,462 | 10/1985 | Koishi et al. | 369/53 |
| 4,768,181 | 8/1988 | Ichinose et al. | 369/54 |
| 4,901,301 | 2/1990 | Senshu | 369/54 |

Primary Examiner—Jeffery A. Brier
Assistant Examiner—Robert Chevalier
Attorney, Agent, or Firm—Stevens, Davis, Miller & Mosher

[57] ABSTRACT

An apparatus for detecting unused sectors in an optical disk or opto-magnetic disk including an envelope detection circuit for detecting an envelope of a read signal to derive an envelope detection signal when data is recorded in a data area of sector. Sector mark and address marks recorded in an identification area are detected to derive sector mark detection signal is generated and address mark detection signals, and an interpolated mark signal corresponding to a synchronizing signal recorded in the data area in accordance with the sector mark detection signal and address mark detection signals. When the envelope detection signal is not produced, the generation of the interpolated mark signal is inhibited. Thus when the synchronizing signal is not detected in the data area and the generation of the interpolated signal is inhibited, the relevant sector is detected as the unused sector.

15 Claims, 10 Drawing Sheets

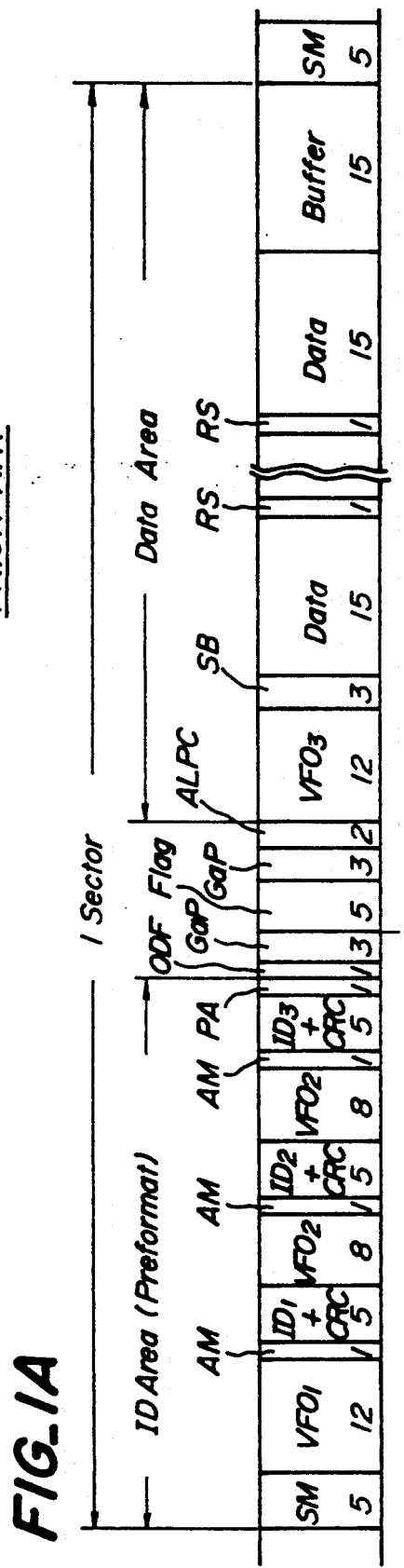
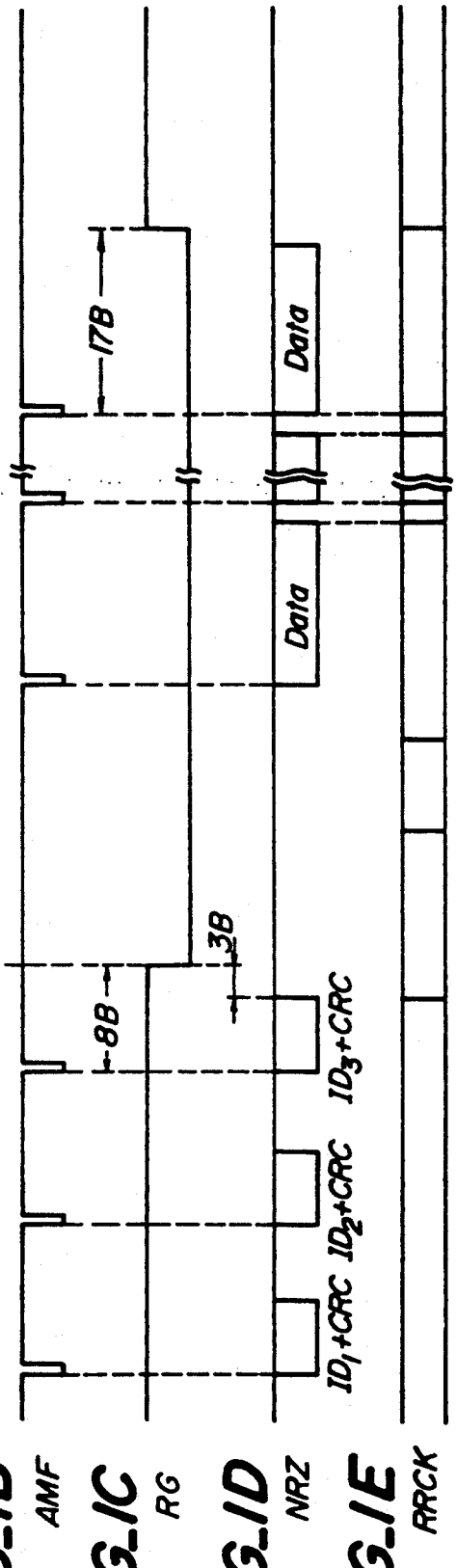

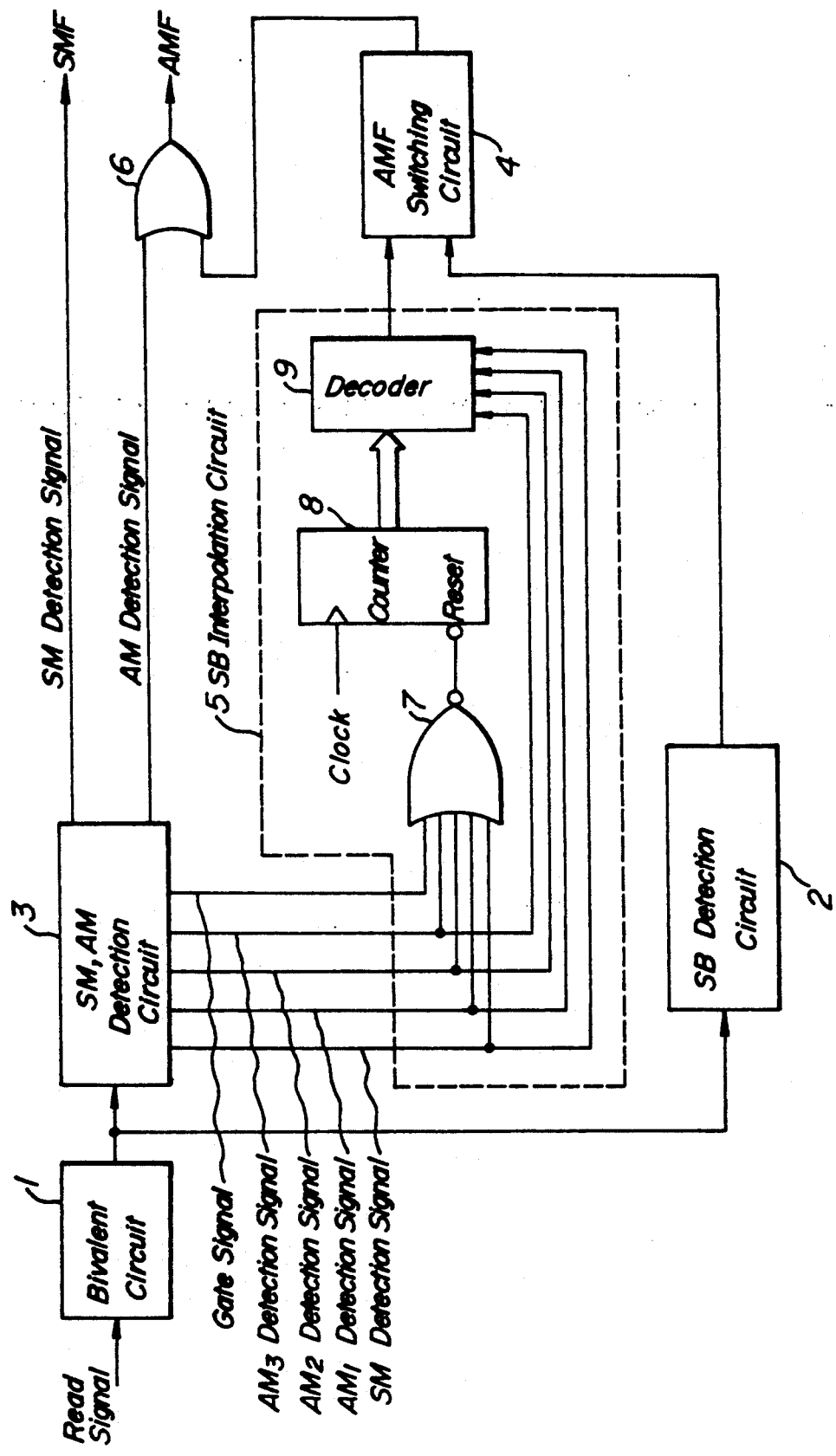
FIG_2 PRIOR ART

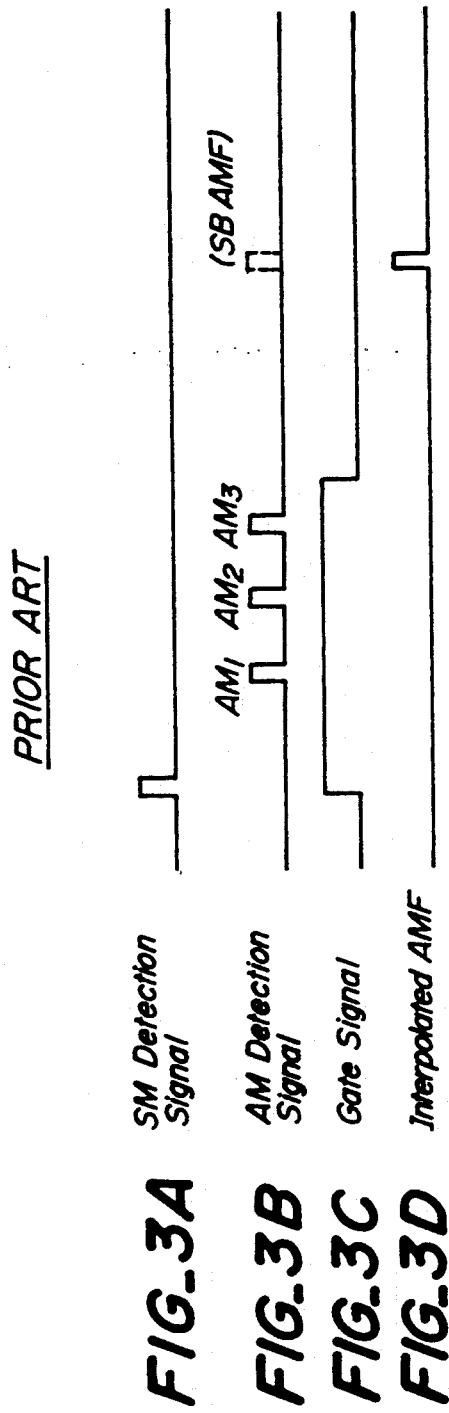

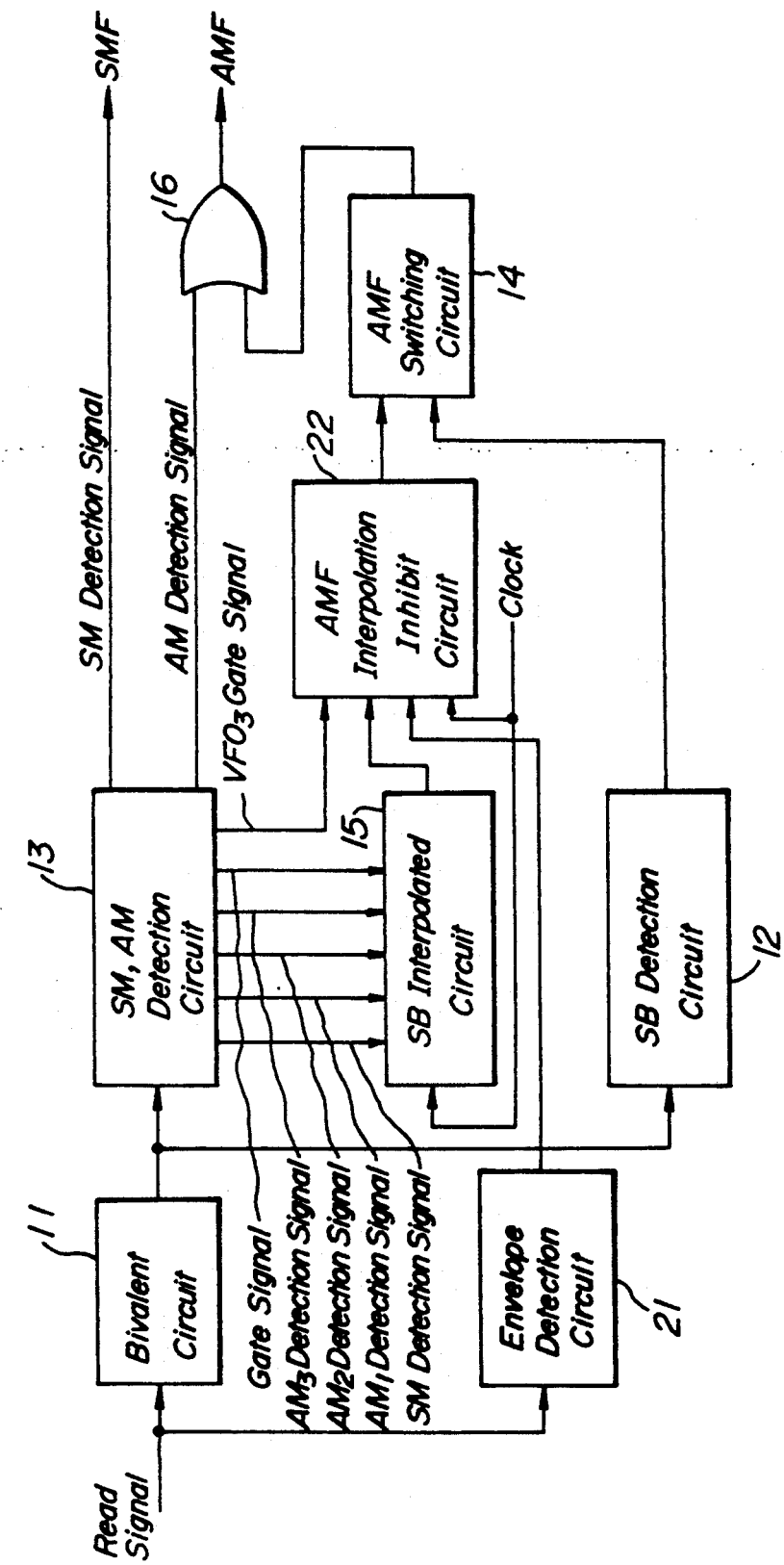

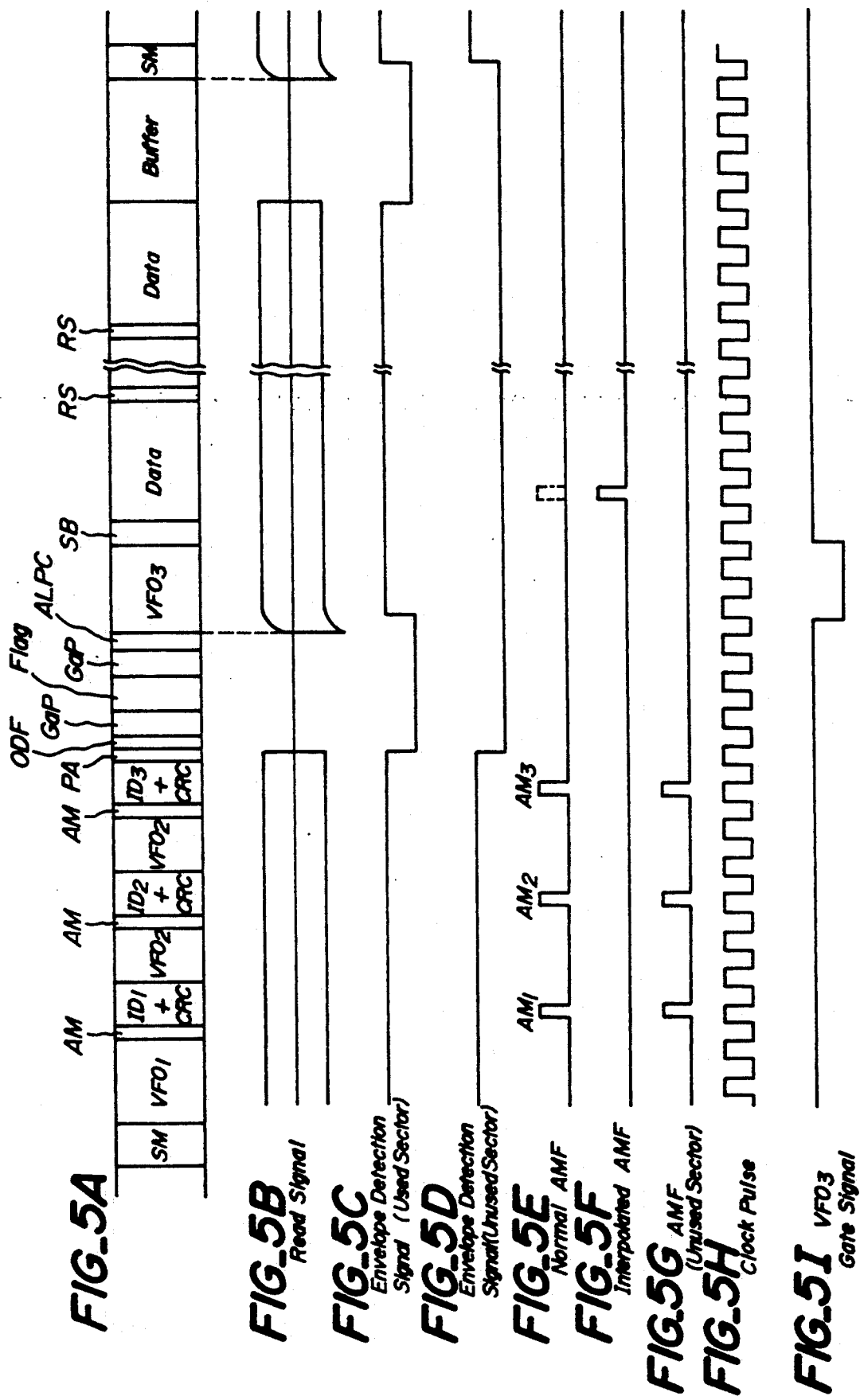

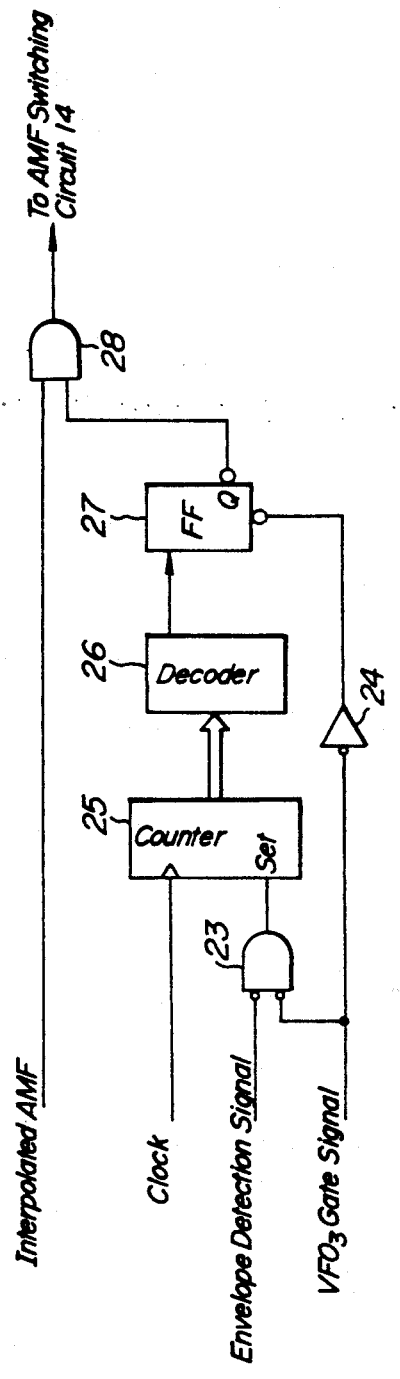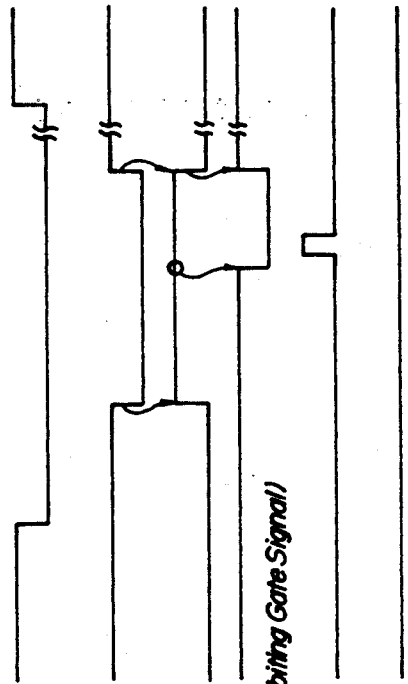

FIG.9A Normal AMF 
FIG.9B Interpolated AMF 
FIG.9C Clock Pulse 
FIG.9D Output of 31 
FIG.9E Output of 32 
FIG.9F Output of 34 
FIG.9G Output of 36 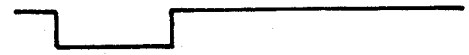
FIG.9H i 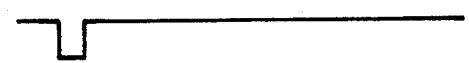
FIG.10A Normal AMF 
FIG.10B Interpolated AMF 
FIG.10C Clock Pulse 
FIG.10D Output of 31 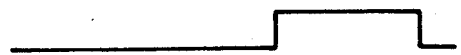
FIG.10E Output of 32 
FIG.10F Output of 34 
FIG.10G Output of 36 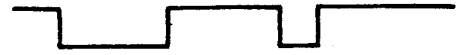
FIG.10H i 

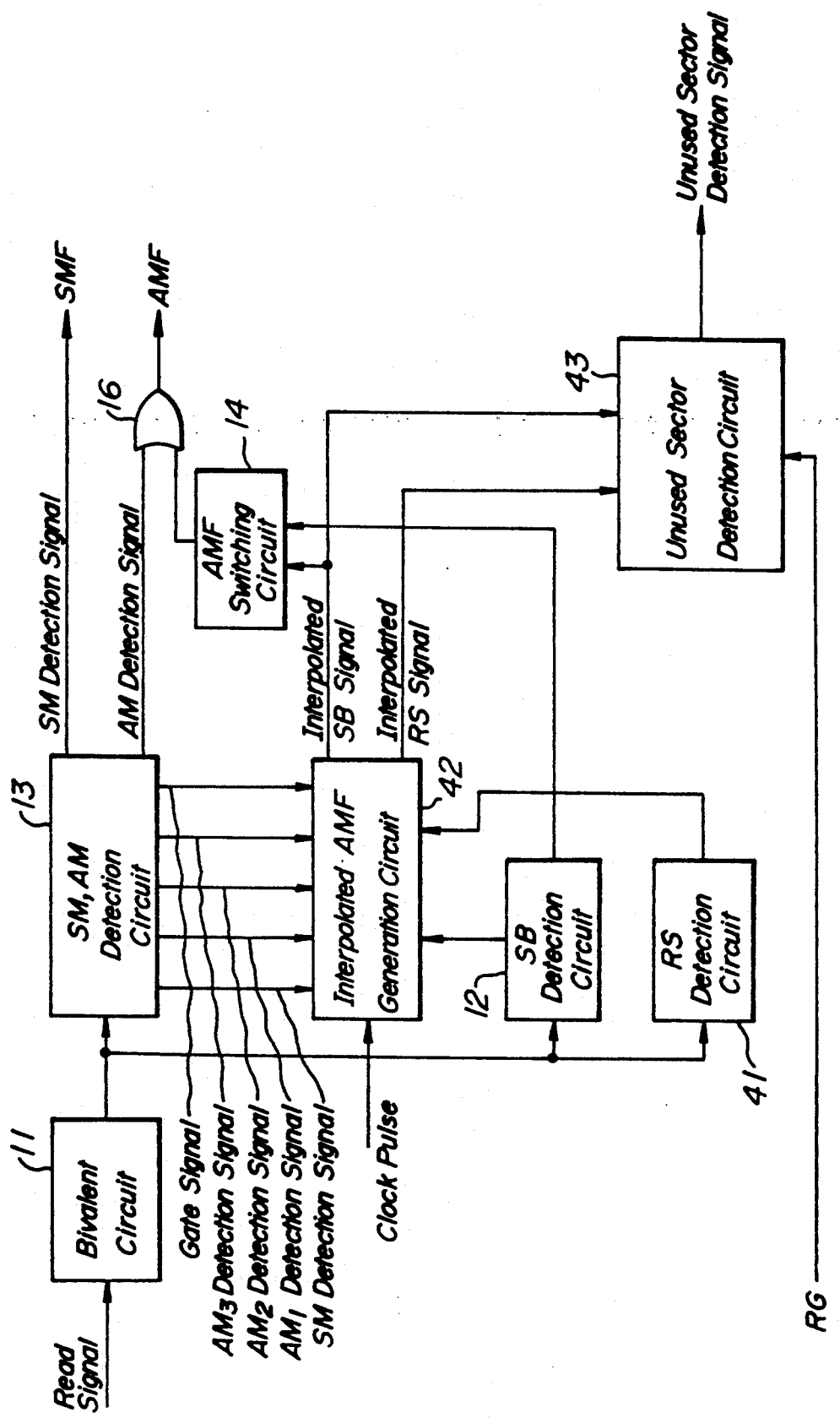
FIG._11

FIG. 13B   Interpolated AMF

FIG. 13C   Unused Sector Detection Signal

APPARATUS FOR DETECTING UNUSED SECTOR ON RECORD MEDIUM

BACKGROUND OF THE INVENTION

Field of the Invention and Related Art Statement

The present invention relates to an apparatus for detecting one or more unused sectors on a record medium, and more particularly to an apparatus for detecting unused sectors on a record medium such as optical disk and opto-magnetic disk which is detachably installed in a recording apparatus. In this specification, the term of "unused sector" means not only a sector in which data has not been recorded, but also a sector in which previously recorded data has been erased.

In a recording apparatus in which a record medium such as a hard disk is fixedly provided, data recorded in the hard disk is generally managed by an operating system (OS), and unused sectors in which no data has been recorded ca be found without reading respective sectors on the record medium. However, in a recording apparatus using a record medium such as optical disk and opto-magnetic disk, the record medium is not fixedly installed in the recording apparatus, but is detachably set in the recording apparatus. In such a recording apparatus, since a directory for managing the sectors is not stored in the recording apparatus, it is necessary to record a directory. To this end it is necessary to detect whether respective sectors have been used or not. Further in some operating systems (OS), the data management is effected such that the condition of record of sectors are successively checked to find a first unused sector, and then sectors following this unused sector are identified as unused sectors.

In the recording apparatus in which the optical disk or opto-magnetic disk is used as the detachable record medium, a sector is read or scanned to generate an address mark found (AMF) signal, and when the AMF signal corresponding to a synchronizing signal (SB) in a data area of the sector, it is judged that the relevant sector has been used and data has been recorded in the sector, so that new data should not be recorded in this sector.

FIG. 1A shows an example of a format of a sector in an optical disk or opto-magnetic disk, and FIGS. 1B to 1E are signal waveforms for explaining the manner of detecting the address mark found (AMF) signal. This sector format has been discussed by ISO for 5.25" WORM (Write Once Read Many type disk) and is generally adopted in the continuous servo tracking system in which the tracking error is detected by the push-pull method. As shown in FIG. 1A the sector includes, between a preformatted identification (ID area) area and a data area in which data has been recorded or is to be recorded, a mirror portion of 1 byte (1B) for detecting an offset of a tracking error signal (Offset Detection Flag: ODF), a gap of 3B (Gap), a flag of 5B (Flag), a gap of 3B (Gap), and a blank of 2B for use in controlling the laser power (Auto Laser Power Control: ALPC).

The ID area is divided into three ID portions and a postamble of 1B (PA). The first ID portion includes sector mark of 5B (SM) for indicating the head of the ID area, PLL synchronization pattern of 12B (VFO$_1$), address mark of 1B (AM$_1$) for indicating a start position of reading the address code data and track number, sector number and error correcting code of 5B (ID$_1$+CRC). The second ID portion is consisting of VFO$_2$ of 8B, AM$_2$ of 1B and ID$_2$+CRC of 5B, and similarly the third ID portion includes VFO$_3$ of 8B, AM$_3$ of 1B and ID$_3$+CRC of 5B. In order to reduce the error three address marks each having the same bit construction are recorded in the ID area. When any one of ID$_1$, ID$_2$ and ID$_3$ is detected, it is judged that ID is identified.

In the data area, there is recorded PLL synchronization pattern VFO$_3$ (which is same as VFO$_1$) of 12B at a start position, and then synchronizing signal SB of 3B is recorded. Further a plurality of data blocks each having a length of 15 B or 20 B are recorded. In each of data blocks following the first data block, there is recorded a re-synchronizing signal of 1B (RS) at a head position. At an end portion of the data area there is further recorded a buffer portion (Buffer) of 15B for a margin for a possible variation of the rotating speed of the record disk.

When the data is read out of the record disk having the sector format shown in FIG. 1A, AMF (shown in FIG. 1B) is first obtained by detecting AM, SB and RS, and then non return zero (NRZ) and synchronized reference clock (RRCK) are derived on the basis of the detected AFM. Then these detected AMF, RRCK and NRZ are supplied to a controller for controlling a drive. FIG. 1C represents a read gate (RG) for reading the data recorded in the data area, FIG. 1D the NRZ and FIG. 1E denotes the RRCK. The reading operation is controlled by the controller in accordance with the detected AMF and reference clock (RRCK).

Therefore, in the optical disk or opto-magnetic disk having the sector format illustrated in FIG. 1A, it is possible to judge whether a sector has been used or not used by monitoring AMFs and detecting whether or not there is AMF corresponding to SB in the data area. That is to say, when the read out AMFs include AM corresponding to SB in the data area, it is judged that the relevant sector has been used, so that new data should not be written.

In a data recording and reproducing apparatus utilizing the optical disk or opto-magnetic disk having the sector format shown in FIG. 1A, AM is generated when a signal of 1B is detected among SB of 3B in order to attain a redundancy in the detecting faculty. Therefore, in some cases SB might not be detected due to the secular variation and defects on the disk. Further when the recording and reproducing operation could not be performed correctly due to error in the focus servo control and tracking servo control which might be caused by the secular variation of the optical system, SB might not be detected.

AS explained above when the unused sectors are detected by judging whether AMF corresponding to SB in the data area is existent or not, a used sector might be erroneously detected as an unused sector and new data might be written over the previously recorded data. Then the previously recorded data might be destroyed. Of course the new data could not be recorded accurately.

In order to avoid the above mentioned drawback, there have been proposed various methods for detecting the unused sectors much more correctly. Since the position of the synchronizing signal SB in the sector is fixed determined, a counter is actuated by detecting SM or AM in the ID area to count clock pulses. When SB is not detected at the predetermined timing, a signal which is generated on the basis of a predetermined count value of the counter is used as an interpolated AMF signal for SB.

FIG. 2 is a block diagram illustrating a known circuit for deriving the interpolated AMF in the manner explained above. The read signal obtained by scanning the record disk is first converted into a bivalent signal by a bivalent circuit 1, and then the thus converted bivalent signal is supplied to an SB detection circuit 2 and an SM and AM detection circuit 3. The SB detection circuit 2 detects SB in the read signal to derive an SB detection signal by processing the bivalent signal from the bivalent circuit 1, and the thus detected SB detection signal is supplied to an AMF switching circuit 4. The SM and AM detection circuit 3 receives the bivalent signal and generates an SM detection signal when SM is detected in the read signal. The AM detection signal is consisting of $AM_1$, $AM_2$ and $AM_3$. The SM and AM detection circuit 3 further generates a gate signal for extracting these SM and AM detection signals. FIGS. 3A to 3C show these signals detected by the SM and AM detection circuit 3.

The SM detection signal, AM detection signal and gate signal derived by the SM and AM detection circuit 3 are supplied to an SB interpolation circuit 5. At the same time, the SM detection signal is supplied to the controller as a sector mark found signal (SMF). The AM detection signal generated by the SM and AM detection circuit 3 is supplied to one input terminal of an OR circuit 6.

The SB interpolation circuit 5 comprises NOR circuit 7, counter 8 and decoder 9. To the NOR circuit 7 are supplied the SM, AM detection signals and gate signal generated by the SM and AM detection circuit 3, and to the decoder 9 are supplied the SM and AM detection signals. The counter 8 counts clock pulses while the counter is reset by an output of the NOR circuit 7. A count value of the counter 8 is supplied to the decoder 9. The decoder receives the count value of the counter 8 and the SM and AM detection signals to derive an interpolated AMF signal shown in FIG. 3D. As shown in FIG. 2, the interpolated AMF signal thus generated is supplied to an AMF switching circuit 4. That is to say, the decoder 9 generates the interpolated AMF each time the counter 8 has counted a predetermined number of clock pulses.

The AMF switching circuit 4 operates such that when the normal AMF is not detected by the SB detection circuit 2, the interpolated AMF generated by the SB interpolation circuit 5 is supplied to the other input terminal of the OR circuit 6. It should be noted that when the normal AMF is detected by the SB detection circuit 2, the normal AMF detection signal is supplied to the OR circuit 6 via the AMF switching circuit 4. In this manner even when the normal AMF is not detected for the used sector due to the various factors, the interpolated AMF signal is supplied from the OR circuit 6, so that it is effectively possible to prevent the recorded data from being destroyed However, in the known apparatus, for unused sectors there is also produced the interpolated AMF signal, it is impossible to detect the unused sectors.

In Japanese Patent Application Laid-open Publication Kokai Sho 60-164834, there is described another known apparatus for detecting unused sectors In this known apparatus, a synchronizing data mark is recorded at a front end of a sector each time data is recorded in a sector, and when a predetermined number of sectors having no data marks are detected, it is judged that a first sector of these sectors is a front one of a series of unused sectors. However, this known apparatus has no means for removing the influence of the defects on the record medium and the secular variation of the optical system. That is to say, if the data marks of used sectors are not detected correctly due to the defects on the record medium, the used sectors might be detected as unused sectors and thus the previously recorded data is destroyed.

SUMMARY OF THE INVENTION

The present invention has for its object to provide a novel and useful apparatus for detecting unused sectors on a record medium always correctly without being affected by defects on the record medium and the secular variation of the record medium and reading apparatus.

According to one aspect of the invention, an apparatus for detecting unused sectors on a record medium comprises mark detecting mean for detecting at least one predetermined mark in a data area of a sector to derive a mark detection signal, said predetermined mark being recorded in the data area when data is recorded in the relevant data area;

interpolating means for generating an interpolated signal of said predetermined mark in accordance with at least one mark prerecorded in an identification area of the sector;

envelope detecting means for detecting an envelope of a data signal obtained by reading the data area to derive an envelope detection signal;

inhibiting means for inhibiting the generation of said interpolated signal from the interpolating means when said envelope detecting means does not produce the envelope detection signal; and judging means for judging the sector to be unused when said mark detection signal is not generated by said mark detecting means and the generation of said interpolated signal is inhibited by said inhibiting means.

According to another aspect of the invention, an apparatus for detecting unused sectors on a record medium comprises first mark detecting means for detecting at least one predetermined mark prerecorded in an identification area of a sector to derive at least one first mark detection signal;

second mark detecting means for detecting a plurality of predetermined marks in a data area of the sector to derive a plurality of second mark signals, said plurality of predetermined marks being recorded in the data area when data is recorded in the relevant data area;

interpolating means for generating one or more interpolated mark signals corresponding to said plurality of predetermined marks in the data area on the basis of said at least one first mark detection signal when one or more of said plurality of predetermined marks in the data area are not detected by said second mark detecting means; and judging means for counting the number of said interpolated mark signals generated by said interpolating means to generate a count value signal and producing an unused sector detection signal when said count value signal reaches a predetermined value.

BRIEF DESCRIPTION OF THE DRAWINGS

FIGS. 1A illustrates a sector format of an optical disk, and FIGS. 1B to 1E are signal waveforms of various mark detection signals;

FIG. 2 is a block diagram showing a known apparatus for detecting unused sectors on an optical disk;

FIGS. 3A to 3D are signal waveforms for explaining the operation of the apparatus shown in FIG. 2;

FIG. 4 is a block diagram depicting an embodiment of the unused sector detecting apparatus according to the invention;

FIGS. 5A to 5I are signal waveforms for explaining the operation of the apparatus illustrated in FIG. 4;

FIG. 6 is a block diagram showing an embodiment of the interpolation inhibit circuit shown in FIG. 4;

FIGS. 7A to 7G are signal waveforms for explaining the operation of the circuit depicted in FIG. 6;

FIGS. 9A to 9H and FIGS. 10A to 10H are signal waveforms for explaining the operation of the apparatus shown in FIG. 8;

FIG. 11 is a block diagram illustrating another embodiment of the unused sector detecting apparatus according to the invention;

FIGS. 13A to 13C are signal waveforms for explaining the operation of the circuit illustrated in FIG. 12.

DESCRIPTION OF THE PREFERRED EMBODIMENTS

Figure 8:
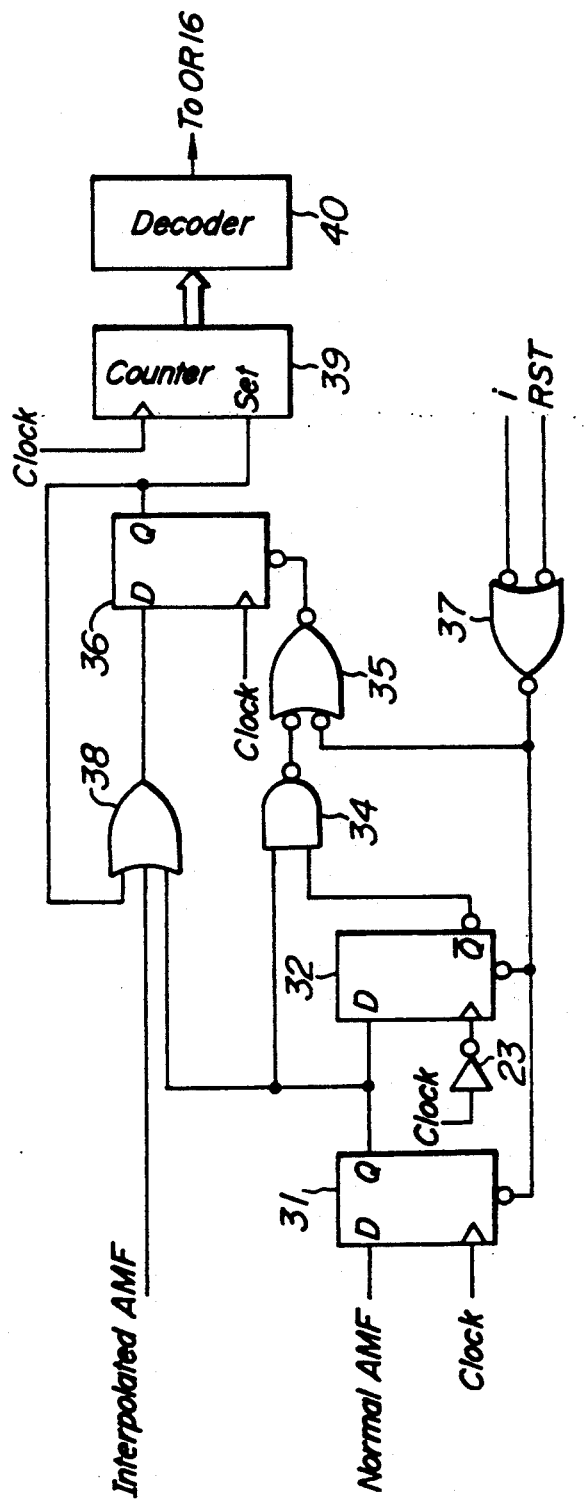
FIG. 8 is a block diagram representing an embodiment of AMF switching circuit shown in FIG. 4.

FIG. 4 is a block diagram showing an embodiment of the unused sector detecting apparatus according to the invention. In the present embodiment, it is judged whether the data is recorded in the data area or not, and when the data is not recorded in the data area, the generation of the interpolated AMF signal is inhibited. In FIG. 4 similar circuits to those of the known apparatus illustrated in FIG. 2 are denoted by the same reference numerals plus ten. Upon comparing the apparatus according to the invention shown in FIG. 4 with the known apparatus illustrated in FIG. 2, it can be found that according to the invention there are additionally provided envelope detection circuit 21 and interpolation inhibit circuit 22.

Now the operation of the apparatus according to the invention shown in FIG. 4 will be explained with reference to waveforms shown in FIGS. 5B to 5I. FIG. 5A depicts the sector format which is same as that shown in FIG. 1A.

The envelope detection circuit 21 detects an envelope of a read signal (shown in FIG. 5B) obtained by scanning the optical disk or opto-magnetic disk and produces an envelope detection signal (FIG. 5C or FIG. 5D) when the detected envelope exceeds a predetermined level. The thus produced envelope detection signal is supplied to the interpolation inhibit circuit 22.

An SM and AM detection circuit 13 processes the bivalent signal supplied from a bivalent circuit 11 to produce SM detection signal, AM detection signal consisting of $AM_1$ to $AM_3$, a gate signal for extracting the SM and AM detection signals and a $VFO_3$ gate signal (FIG. 5I) for extracting the $VFO_3$ recorded in the data area. The $VFO_3$ gate signal is supplied to the interpolation inhibit circuit 22 together with the interpolated AMF for SB generated by an SB interpolation circuit 15. The output signal from the interpolation inhibit circuit 22 is supplied to an AMF switching circuit 14 together with the SB signal generated by the SB detection circuit 12.

The position of $VFO_3$ in the sector format is predetermined, so that the $VFO_3$ gate signal is formed by counting the clock pulses on the basis of at least one of the SM detection signal and $AM_1$ to $AM_3$ detection signals and by decoding a count value. For instance, when the $AM_1$ detection signal is used as a reference and one clock corresponds to 1 bit, the leading edge of the $VFO_3$ gate signal can be obtained by counting 384 clock pulses, because there are 48 bytes (384 bits) from $ID_1$ to AIPC (see FIG. 1A). However, in practice the leading edge of the $VFO_3$ gate signal is further delayed by 2 bytes (16 bits) by considering the delay of the $AM_1$ detection signal and transient of the read circuit at the front end of $VFO_3$. When SM detection signal or $AM_2$ or $AM_3$ detection signal is used as the reference timing, the leading edge of the $VFO_3$ gate signal can be determined by decoding corresponding count values. When the variation of the rotation of a spindle motor for rotating the optical disk or opto-magnetic disk is taken into consideration, it is advantage to use the $AM_3$ detection signal which is generated at the latest timing. In this case, after the $AM_3$ detection signal is detected, the leading edge of the $VFO_3$ gate signal is produced when 160 clock pulses (corresponding to 20 bytes) have been counted.

The trailing edge of the $VFO_3$ gate signal is preferably set at a position after 3 bytes from SB, so that when the $AM_3$ detection signal is used as the reference signal, the trailing edge of the $VFO_3$ gate signal is set by counting 280 clock pulses.

FIG. 6 is a block diagram showing an embodiment of the interpolation inhibiting circuit 22 shown in FIG. 4. The interpolation inhibiting circuit 22 comprises NOR circuit 23, inverter 24, counter 25, decoder 26, flip-flop 27 and AND circuit 28. To the NOR circuit 23 are supplied the envelope detection signal generated by the envelope detection circuit 21 and the $VFO_3$ gate signal generated by the SM and AM detection circuit 13. An output of the NOR circuit 23 is supplied to a set terminal of the counter 25. Therefore, while the output signal of the NOR circuit 23 is in the high level i.e. while both the $VFO_3$ gate signal and envelope detection signal are in the low level, the counter 25 counts clock pulses. A count value of the counter 25 is supplied to the decoder 26. An output signal of the decoder 26 is supplied to the flip-flop 27 and an output signal of the flip-flop is supplied to one input terminal of the AND circuit 28 as the interpolated AMF inhibiting signal. To the other input terminal of the AND circuit 28 is supplied the interpolated AMF for SB which should be detected by the SB detection circuit 15.

For the unused sector, a count value of the counter 25 reaches a predetermined value, and the high level signal is supplied from the decoder 26 to the flip-flop 27 to change the Q output signal of the flip-flop into the low level. Therefore, the interpolated AMF inhibiting signal of the low level is supplied to the AND circuit 28, so that the supply of the interpolated AMF to the AMF switching circuit 14 via the AND circuit is inhibited, and the relevant sector is judged as the unused sector.

As explained above, since the counter 25 counts the clock pulses for a predetermined time period set by the $VFO_3$ gate signal, the flip-flop 27 is not set until the count value of the counter 25 has reached the predetermined value even when the envelope detection signal becomes the low level temporarily due to defects of the optical disk or opto-magnetic disk. In this manner the unused sectors can be detected correctly without being affected by the defects on the optical disk or opto-magnetic disk and the secular variation of the optical system.

The $VFO_3$ gate signal is further supplied to a reset terminal of the flip-flop 27 via the inverter 24, so that the flip-flop is reset when the $VFO_3$ gate signal becomes the high level.

As explained above, according to the present invention, for the unused sector the envelope detection signal becomes the low level at the $VFO_3$ and SB, the generation of the interpolated AMF of SB from the SB interpolation circuit 15 is inhibited, and thus the unused sector can be detected accurately and positively.

Now the AMF switching circuit 14 will be explained with reference to the block diagram shown in FIG. 8. The normal AMF of SB detected by the SB detection circuit 12 is supplied to a data input terminal of a first D-type flip-flop (D-FF) 31 and is generated from Q output thereof in synchronism with a leading edge of a clock pulse. The Q output signal of the D-FF 31 is supplied to a data input terminal of a second D-FF 32 and is further supplied to Q output thereof in synchronism with a leading edge of a clock pulse inverted by an inverter 33. The Q output signal of the second D-FF 32 is supplied to NAND circuit 34 together with the Q output signal from the first D-FF 31 to derive a timing pulse corresponding to the leading edge of the normal AMF which is then supplied to a reset terminal of a third D-FF 36 via an OR circuit 35. To the reset terminal of the third D-FF 36 are further supplied by means of an OR circuit 37 and the OR circuit 35 a signal i generated at a timing corresponding to $VFO_3$ situated just before SB and a reset signal RST which is generated when the electric power for the apparatus is switched on. The signal i corresponding to $VFO_3$ may be generated by a circuit similar to the SB interpolation circuit 15.

To a data input terminal of the third D-FF 36 are supplied via an OR circuit 38 Q output signal of the third D-FF, Q output signal of the first D-FF 31 and the interpolated AMF generated by the interpolated AMF inhibiting circuit 22 shown in FIG. 6. A Q output signal of the third D-FF 36 is supplied to a set terminal of a counter 39 such that the counter is reset by the leading edge (falling edge) of the Q output signal of the third D-FF 36 and is set by the trailing edge (raising edge) of the Q output signal to allow the counting of the clock pulses. A count value of the counter 39 is supplied to a decoder 40, so that when the counter has counted a given number of clock pulses, the decoder produces the AMF of SB which is supplied to the OR circuit 16 shown in FIG. 4.

FIGS. 9A and 9H and FIGS. 10A to 10H show signal waveforms for explaining the operation of the AMF switching circuit illustrated in FIG. 8. The Q output of the third D-FF 36 becomes the low level at $VFO_3$ and then returns to the high level in synchronism with the raising edge of a clock pulse which occurs after the output of the NAND circuit 34 has returned to the high level.

It should be noted that the output signal of the OR circuit 37 is also supplied to the reset terminals of the first and second D-FFs 31 and 32, so that the Q outputs of these D-FFs are reset thereby.

In the present embodiment, when the used sector is scanned, both the normal AMF and the interpolated AMF are generated. In this case, if these AMFs are generated at the same timing, any one of them may be used to set the third D-FF 36 to actuate the counter 39. In the present embodiment, in order to attain the correct operation even when the normal and interpolated AMFs are generated at different timings, the normal AMF is predominantly used. Therefore, to the data input terminal D of the third D-FF 36 are supplied the Q output signal of this third D-FF, the Q output signal of the first D-FF 31 and the interpolated AMF via the OR circuit 38.

In case that the interpolated AMF is delayed with respect to the normal AMF as shown in FIGS. 9A and 9B, when the Q output signal of the third D-FF 36 is set into the high level by the preceding normal AMF, the Q output signal of high level is supplied to the data input terminal D of the third D-FF, so that the Q output is remained high level. Therefore, when the interpolated AMF becomes high level, the Q output of the third D-FF 36 is not changed. When the interpolated AMF proceeds with respect to the normal AMF as shown in FIGS. 10A and 10B, the Q output of the third D-FF 36 is set to the high level by the interpolated AMF and the counter 39 starts to count the clock pulses. However, before the decoder 40 generates the output signal, the Q output of the third D-FF 36 is changed into the low level in response to the normal AMF, so that the counter 39 is reset to restart the counting of the clock pulses. In this manner, the counter 39 is actuated predominantly by the normal AMF. Of course, when the normal AMF is not detected but the interpolated AMF is generated for the used sector, the third D-FF 36 is set by the interpolated AMF to actuate the counter 39.

FIG. 11 is a block diagram showing another embodiment of the unused sector detecting apparatus according to the invention. In the present embodiment, when SB and RS are not detected, the number of interpolated AMFs is counted and the unused sector is detected in accordance with the count value. The read signal is converted by the bivalent circuit 11 into the bivalent signal and the thus obtained bivalent signal is supplied to SB detection circuit 12, SM and AM detection circuit 13 and RS detection circuit 41. The SB detection circuit 12 detects the SB (synchronizing signal in the data area) and the SM and AM detection circuit 13 detects the sector mark SM, the address mark AM consisting of $AM_1$ to $AM_3$, and the gate signal for extracting these SM and AM signals. The RS detection circuit 41 detects the resynchronizing signal in the data area (RS).

The output signals generated by the SB detection circuit 12, the SM and AM detection circuit 13 and the RS detection circuit 41 are supplied to an interpolated AMF generation circuit 42. The interpolated AMF generation circuit 42 has a similar construction to that of the SB interpolation circuit 15 shown in FIG. 4 and generates the interpolated SB signal and the interpolated RS signal on the basis of the signals supplied from the SB and AM detection circuit 13 each time the SB and RS signals are not detected by the SB detection circuit 12 and the RS detection circuit 41, respectively. That is to say, when the SB signal in the data area is not detected by the SB detection circuit 12, the interpolated AMF generation circuit 42 generates the interpolated SB signal. Similarly when the RS detection circuit 41 does not detect an RS signal, the interpolated AMF generation circuit 42 generates an interpolated RS signal. The interpolated SB and RS signals thus generated are supplied to an unused sector detection circuit 43.

Similar to the embodiment illustrated in FIG. 4, the SB detection signal generated by the SB detection circuit 12 and the interpolated SB signal generated by the interpolated AMF generation circuit 42 are supplied to the AMF switching circuit 14 to derive the AMF of SB in accordance with these signals, and the thus obtained AMF is supplied to the OR circuit 16. The SB detection signal generated by the SB and AM detection circuit 13 is supplied to the controller as SMF and the AM detection signal is supplied to the OR circuit 16 to derive therefrom AMF.

Figure 12:
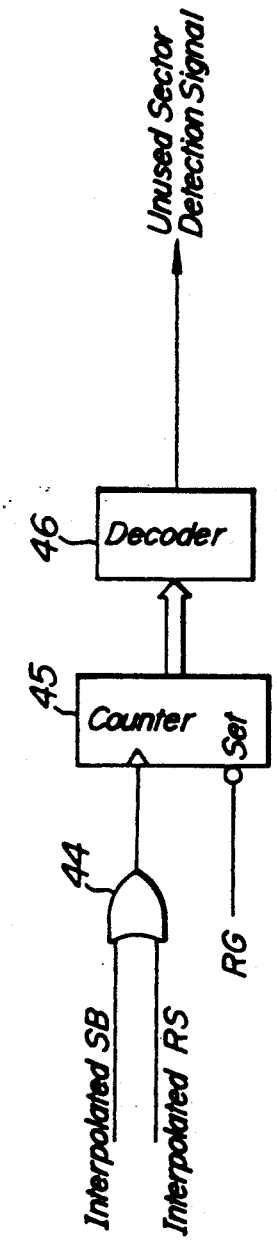
FIG. 12 is a block diagram showing an embodiment of the unused sector detecting circuit shown in FIG. 11.

FIG. 12 is a block diagram showing an embodiment of the unused sector detection circuit 43. The unused sector detection circuit 43 comprises OR circuit 44, counter 45 and decoder 46. To the OR circuit 44 are supplied the interpolated SB signal and interpolated RS signal generated by the interpolated AMF generation circuit 43 and the output signal of the OR circuit is supplied to a clock input terminal of the counter 45. To the set terminal of the counter 45 is supplied a read gate signal (RG) for reading the data in the data area. While the read gate signal is in the low level, the counter 45 counts the interpolated AMFs supplied from the OR circuit 44 and a count value of the counter is supplied to the decoder 46. The decoder 46 generates an unused sector detection signal when the count value in the counter 45 has reached a predetermined value.

Figure 13A:
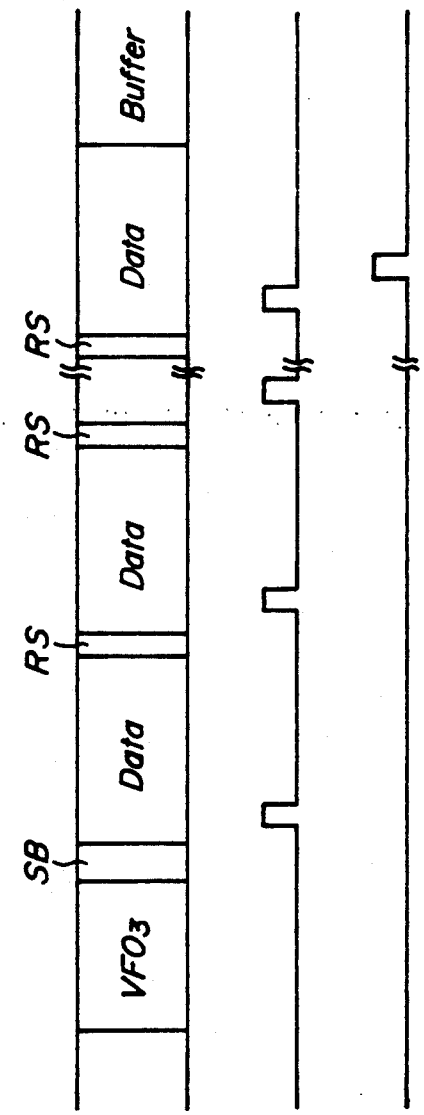

As shown in FIGS. 13A to 13C, for the unused sector, the interpolated AMFs are generated at timings corresponding to the SB and RS signals in the data area. It should be noted that in the unused sector there are not actually recorded the SB and RS signals. The counter 45 counts the interpolated SB and RS signals, i.e. the interpolated AMF signals and the decoder 46 generates the unused sector detection signal when a count value of the counter has reached a predetermined value N. Said predetermined value N for generating the unused sector detection signal may be determined as follows. Now it is assumed that A represents an unformat capacity of the disk, B the total number of bytes in a sector, C the number of bytes of a data area, D the number of bytes of a data area (equal to C), E the number of bytes of RS in a sector, F an error rate and G denotes a safety coefficient. Then, the above mentioned threshold number N can be expressed as follows.

$$A \times C/B \times E/D \times F \times G$$

In the present embodiment, the predetermined number N is set to 10.

Further in the present embodiment, when the unused sector detection signal is generated by the unused sector detection circuit 43, the relevant sector is read out again, and when the unused sector detection signal is generated again, the relevant sector is finally judged as the unused sector. In this manner, also in the present embodiment, the unused sector can be always detected correctly.

The present invention is not limited to the embodiments explained above, but may be modified in various ways within the scope of the invention. For instance, in the first embodiment, the interpolated AMF signal is generated for SB and the supply of the interpolated AMF signal is inhibited by the envelope detection signal. However the interpolated AMF signal may be generated for RS in the data area and the generation of the interpolated AMF signal may be inhibited by the envelope detection signal. Further in the second embodiment, the predetermined number N for the count value obtained by the counter for counting the interpolated AMF signals is set to 10. However, this count value N may be determined at will in accordance with the safety coefficient G. Further, in the second embodiment, when a sector is judged as the unused sector, the relevant sector is read again, and when the sector is judged as the unused sector again, it is finally judged that the relevant sector is the unused sector. However, it is not always necessary to effect such a dual checking.

As explained above in detail, according to the invention, when the envelope detection signal is not detected for the data area in the sector, the generation of the interpolated signal formed on the basis of the marks prerecorded in the identification area in the sector is inhibited. Therefore, the unused sector can be detected always correctly without being influenced by the defects on the record medium and the secular variation of the optical system. Further according to the second aspect of the present invention, when the given number of marks are not recorded in the data area, the interpolated signals are generated o the basis of the marks prerecorded in the identification area, and when the number of interpolated signals is reaches the predetermined value, it is judged the relevant sector is the unused sector. Also in this case the unused sectors can be detected correctly without being influenced by the defects on the record medium and the secular variation of the optical system.

What is claimed is:

1. An apparatus for detecting unused sectors based on a read signal obtained from a record medium having thereon a plurality of sectors on which data are to be read and written, the apparatus comprising:
   first mark detecting means for detecting in said read signal at least one predetermined mark prerecorded in an identification area of a sector to derive a first mark detection signal;
   second mark detecting means for detecting in said read signal at least one predetermined mark in a data area of the sector to derive a second mark detection signal, said predetermined mark being recorded in the data area when data are recorded in the relevant data area;
   interpolating means for generating an interpolated mark signal corresponding to said predetermined mark in the data area in accordance with said first mark signal;
   envelope detecting means for detecting an envelope of a data signal in said read signal to derive an envelope detection signal; and
   inhibiting means for inhibiting the generation of said interpolated mark signal from the interpolating means when said envelope detecting means does not produce the envelope detection signal.

2. An apparatus for detecting unused sectors on a record medium according to claim 1 further comprising:
   judging means for judging the sector to be unused when said second mark detection signal is not produced by said second mark detecting means and the generation of said interpolated mark signal is inhibited by said inhibiting means.

3. An apparatus according to claim 2, wherein said second mark detecting means is constructed to detect a synchronizing signal recorded in the data area, and said interpolating means is constructed to generate an interpolated synchronizing signal corresponding to said synchronizing signal.

4. An apparatus according to claim 3, wherein said first mark detecting means comprises a mark detection circuit for detecting sector mark and address marks including a last address mark prerecorded in the identification area to derive sector mark detection signals and producing a gate signal for extracting the sector mark and address marks, and said interpolating means comprises an interpolation circuit for generating said interpolated synchronizing signal on the basis of the sector mark signal, the address mark signals and the gate signal.

5. An apparatus according to claim 45, wherein said interpolation circuit is constructed such that said interpolated synchronizing signal is generated on the basis of the last address mark in the identification area.

6. An apparatus according to claim 5, wherein said inhibiting means is constructed such that the generation of the interpolated mark signal is inhibited when the envelope detection signal is not detected for a predetermined time period when the data area is read out.

7. An apparatus according to claim 6, further comprising clock means for producing clock pulses, and wherein said inhibiting means comprises a counter having a data input terminal for receiving said clock pulses and a set terminal, a NOR circuit having a first input terminal for receiving the envelope detection signal and a second input terminal for receiving the gate signal produced by the mark detection circuit for extracting a phase lock synchronizing signal recorded in the data area, a decoder for producing an output signal when a count valve of the counter has reached a predetermined value, a flip-flop which is set by said output signal of the decoder to produce an interpolation inhibit signal, and an AND circuit having a first input terminal for receiving the interpolated mark signal and a second input terminal for receiving said interpolation inhibit signal.

8. An apparatus according to claim 7, wherein said inhibiting means further comprises an inverter for receiving said gate signal and for supplying an inverted gate signal to a reset terminal of said flip-flop.

9. An apparatus according to claim 2, wherein said judging means comprises a switching circuit for selecting said interpolated mark signal and the mark detection signal, and an OR circuit having a first input terminal for receiving an output signal generated by said switching circuit and a second input terminal for receiving said first mark signal generated by said first mark detecting means.

10. An apparatus according to claim 9, wherein said switching circuit is constructed to select predominantly the first mark detection signal.

11. An apparatus for detecting unused sectors based on a read signal obtained from a record medium having thereon a plurality of sectors on which data are to be read and written, the apparatus comprising:
first mark detecting means for detecting in said read signal at least one predetermined mark prerecorded in an identification area of a sector to derive at least one first mark detection signal;
second mark detecting means for detecting in said read signal a plurality of predetermined marks in a data area of the sector to derive a plurality of second mark signals, said plurality of predetermined marks being recorded in the data area when data are recorded in the relevant data area; and
interpolating means for generating one or more interpolated mark signals corresponding to said plurality of predetermined marks in the data area on the basis of said at least one first mark detection signal when one or more of said plurality of predetermined marks in the data area are not detected by said second mark detecting means.

12. An apparatus for detecting unused sectors on a record medium according to claim 11 further comprising:
judging means for counting the number of said interpolated mark signals generated by said interpolating means to generate a count value signal and producing an unused sector detection signal when said count value signal reaches a predetermined value.

13. An apparatus according to claim 12, wherein said second mark detecting means comprises a first mark detection circuit for detecting a synchronizing signal recorded in the data area and a second mark detection circuit for detecting a plurality of resynchronizing signals recorded in the data area, and said interpolating means comprises an interpolated signal generation circuit for generating an interpolated synchronizing signal when said first mark detection circuit does not produce said synchronizing signal and an interpolated resynchronizing signal each time said second mark detection circuit does not generate said resynchronizing signal.

14. An apparatus according to claim 13, wherein said judging means comprises a counter having a data input terminal for receiving said interpolated synchronizing and resynchronizing signals, and a decoder for receiving a count value of said counter to generate the unused sector detection signal when the count value has reached the predetermined value.

15. An apparatus according to claim 14, wherein said counter has a set terminal which receives a read gate signal for extracting signals recorded in the data area of the sector.

* * * * *